US007478526B2

(12) United States Patent
McAfee et al.

(10) Patent No.: US 7,478,526 B2
(45) Date of Patent: Jan. 20, 2009

(54) SPEED CONTROL APPARATUS FOR A ROTARY SPRINKLER

(75) Inventors: Michael A. McAfee, Tucson, AZ (US); Cesar A. Gomez, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 395 days.

(21) Appl. No.: 11/182,379

(22) Filed: Jul. 15, 2005

(65) Prior Publication Data

US 2007/0012800 A1 Jan. 18, 2007

(51) Int. Cl.
*F02K 9/38* (2006.01)
*B05B 15/10* (2006.01)

(52) U.S. Cl. ............................ 60/223; 60/235; 60/233; 60/201; 239/205; 239/206; 239/580

(58) Field of Classification Search ................ 239/241, 239/580, 237, 240, 101–206, 463, 465, 521, 239/523, 571, 575; 60/235, 233, 223, 201
See application file for complete search history.

(56) References Cited

U.S. PATENT DOCUMENTS 4,681,260 A 7/1987 Cochran
4,687,139 A 8/1987 Lockwood
4,783,004 A 11/1988 Lockwood
4,815,662 A 3/1989 Hunter
4,892,252 A 1/1990 Bruninga
4,932,590 A 6/1990 Hunter
4,989,786 A 2/1991 Kranzle et al.
5,031,833 A 7/1991 Alkalay et al.
5,115,977 A 5/1992 Alkalay et al.
5,169,286 A 12/1992 Yamada
5,174,501 A 12/1992 Hadar
5,375,768 A 12/1994 Clark
5,598,975 A 2/1997 Jager
5,685,486 A * 11/1997 Spenser ...................... 239/242
5,718,381 A 2/1998 Katzer et al.
5,823,440 A 10/1998 Clark
5,909,848 A 6/1999 Zink
5,927,607 A 7/1999 Scott
6,155,494 A 12/2000 Fabbri et al.
6,193,169 B1 2/2001 Steinhilber et al.
6,254,013 B1 7/2001 Clearman et al.
6,457,656 B1 10/2002 Scott
6,502,764 B2 * 1/2003 Walker ....................... 239/203
6,732,950 B2 * 5/2004 Ingham et al. .............. 239/205
6,814,304 B2 11/2004 Onofrio
6,883,727 B2 * 4/2005 De Los Santos ............ 239/240
6,929,194 B2 8/2005 Lawson
7,097,116 B2 * 8/2006 Fernandez .................. 239/206
7,232,078 B2 * 6/2007 Kah, Jr. ......................... 239/1
2002/0162901 A1 11/2002 Hunter et al.
2002/0162902 A1 11/2002 Kah, Jr.
2003/0085303 A1 5/2003 Jaeger
2003/0150935 A1 8/2003 Renquist
2004/0164178 A1 8/2004 Kah, Jr.

* cited by examiner

*Primary Examiner*—Len Tran
*Assistant Examiner*—James S Hogan
(74) *Attorney, Agent, or Firm*—Fitch, Even, Tabin & Flannery

(57) ABSTRACT

A turbine for a sprinkler is disclosed for self-governing its rotational velocity. As a rate of fluid through the sprinkler increases, particularly when air is used to flush the sprinkler system, a portion of the turbine shifts outwardly so as to decrease alignment of vanes located thereon with directed water streams for controlling the rotation of the turbine.

9 Claims, 4 Drawing Sheets

SPEED CONTROL APPARATUS FOR A ROTARY SPRINKLER

FIELD OF THE INVENTION

The invention relates to a water-driven rotary sprinkler and, in particular, to a rotary sprinkler having a speed-control apparatus.

BACKGROUND OF THE INVENTION

Many current irrigation systems utilize a combination of water emission devices or sprinklers coupled together by a system of irrigation pipes for delivering water to the sprinklers. In some environments, such as large scale irrigation of agricultural lands, the sprinkler system is principally above ground and is designed to be moved from one location to another. In other environments, the sprinkler system is principally installed under a ground surface, with an emission portion either co-located with the ground or designed to extend from a retracted position when the system is turned-on or activated.

As the systems installed within the ground are designed to be generally permanently installed, problems arise due to weather conditions. As is known, the water typically delivered by the sprinkler system expands when it freezes. The presence of fertilizer or other chemicals in the water is usually not sufficient to reduce the freezing point sufficiently, and most parts of the United States, for instance, experience winter air temperatures sufficient to freeze the water.

The entirety of the sprinkler system is not necessarily susceptible to the freezing. For instance, the irrigation pipes running generally parallel to the ground surface may be buried to a depth sufficient to be below a frost line, and vertical pipes, risers, and stems may be used with the emission device so that most water will drain downward when the system is de-activated. Such a design, however, may still fail to clear all of the water out, while requiring significantly more materials and labor to construct or repair.

The most common approach to preparing the irrigation system and sprinklers for impending cold weather is a winterization procedure in which high-pressured or compressed air is blown into the system. The air passes through the entire system and simultaneously dries the system and drives water from the pipes, sprinklers, and other controls.

Problems may arise from the winterization of sprinklers utilizing water-driven components. One type of sprinkler utilizes the flow of water therethrough to power the sprinkler, and many of these sprinklers are rotary sprinklers where the flow of water drives a motor or other mechanism for rotating a sprinkler head. Such sprinklers tend to present a great problem with winterization.

More particularly, these rotary sprinklers include a sprinkler head rotatably supported by a generally non-rotating housing. The non-rotating housing is often a riser which moves between a retracted position generally within a stationary housing buried in the ground surface and an extended position generally extended from the stationary housing to a position above the ground. Water flowing through the sprinkler typically contacts a water-driven structure such as a turbine having vanes so that a portion of the kinetic energy of the water is imparted to and rotates the turbine. A speed-reducing drive mechanism is operably coupled to the turbine and to the sprinkler head so that the high-speed rotation of the turbine (in the order of 1000-2000 revolutions per minute, though some operate as low as 500 revolutions per minute) is reduced so that the sprinkler head rotates at approximately ⅓ revolution per minute.

In the absence of any control and for a constant nozzle size, the rate of rotation for the turbine is generally dependent only on the pressure of the water flowing therethrough and on the size of a nozzle or orifice directing the water into the turbine. Under normal operating conditions, pressurized water flows through the sprinkler and causes the high rate of rotation for the turbine, which, as mentioned above, can be on the order of 1000-2000 revolutions per minute. Accordingly, when high-pressured air is injected through the system for winterization, an even higher resultant velocity is experienced by the turbine. Such higher velocity can be on the order of 40,000 revolutions per minute, and it is communicated through the sprinkler via the drive mechanism to the sprinkler head and to any other internal components.

Winterization using air creating this higher velocity can lead to damage in a rotary sprinkler. The principal concern comes from devices operating at speeds that are orders greater than for what the components were designed. This can result in unpredictable behavior, particular due to an eccentricity in a spinning component. Moreover, the friction and heat generated by the high-speed rotation has a negative effect on the components and can rapidly progress to failure by the components.

Currently, there are a number of mechanisms in existence for reducing the speed of a turbine or drive mechanism of a rotating sprinkler due to excessive flow. Bypass valves allow a portion of the water to pass directly through a stator structure instead of being focused at the turbine vanes. The velocity of the air against the turbine is generally dependent on the size of the orifice directing the air against the turbine and on a pressure drop across the stator. The reduction in pressure above the orifice due to the opening of a bypass valve may hold the pressure across the stator constant, but is simply not sufficient to lower the velocity of the air being directed at the turbine.

Another method for controlling rotation due to high flow utilizes centripetal force to shift two portions into frictional contact. Regardless of the efficiency or long-life of such a design, were this method relied upon during winterization, the amount of friction would be far in excess of expected levels for water operation. Accordingly, such friction devices serve to accelerate the failure of sprinklers that are winterized with pressurized air.

Accordingly, there is a need for a rotary sprinkler with a design improved for winterization.

DESCRIPTION OF THE PREFERRED EMBODIMENTS

Figure 1:
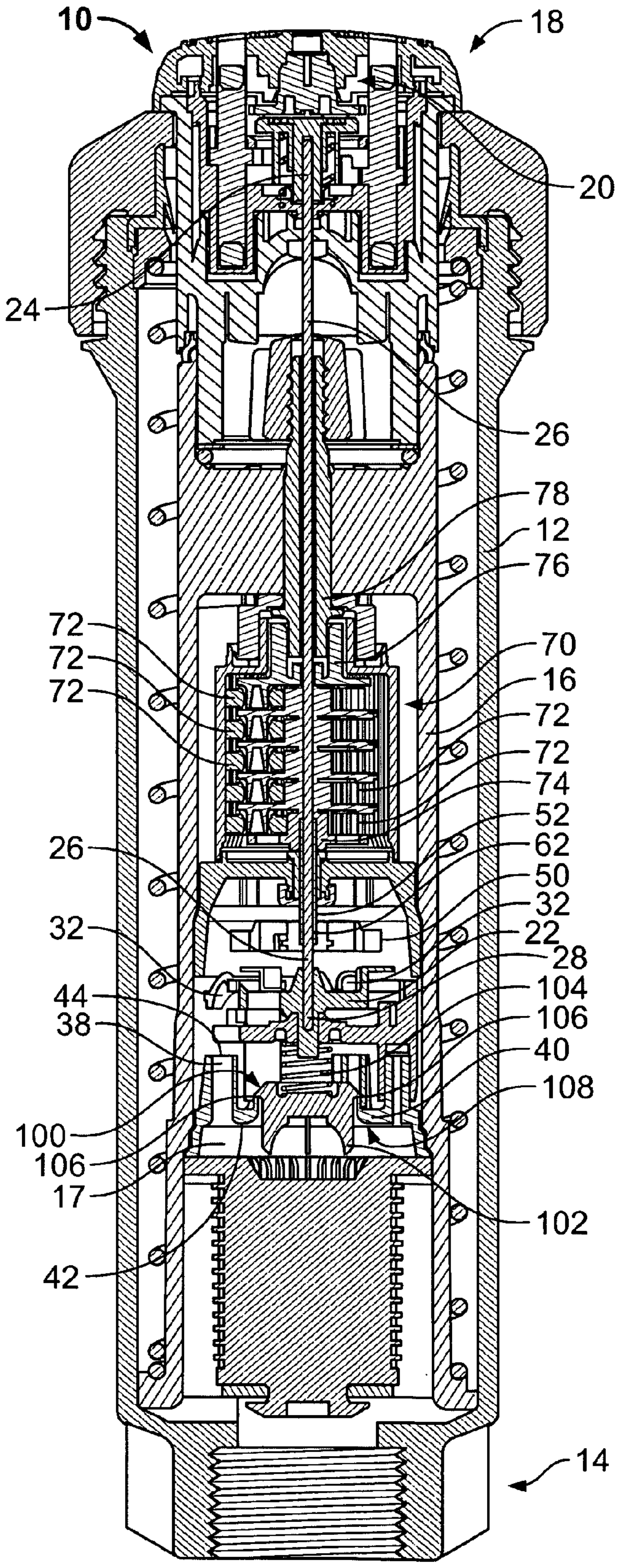
FIG. 1 is a cross-sectional view of a pop-up rotary sprinkler including a turbine for rotating a sprinkler head.

Referring initially to FIG. 1, there is illustrated a rotary sprinkler 10 for distributing water radially therefrom. The sprinkler 10 includes a water-driven mechanism which includes a turbine 50. The sprinkler 10 has a stationary housing 12 having a lower end 14 for threaded connection with a source pipe (not shown). Under normal operating conditions, the sprinkler 10 receives pressurized water from the source pipe, and under winterization conditions, compressed air is forced through the source pipe and through the sprinkler 10.

The sprinkler 10 includes a movable housing or riser 16 for rotatably supporting a sprinkler head 18. In FIG. 1, the riser 16 is shown retracted as it would be when not activated by pressurized fluid. When activated by the flow of fluid through the sprinkler 10, the riser 16 telescopically extends from the stationary housing 12 so that the sprinkler head 18 is above and clear of the stationary housing 12. More specifically, the extended position allows a nozzle (not shown) in the sprinkler head 18 to be positioned above the stationary housing 12. As will be discussed below, the flow of fluid through the sprinkler 10 powers the sprinkler head 18 in a rotational manner to distribute water in a radial pattern from the nozzle.

The sprinkler 10 distributes water in an arcuate extent preselected by a user or installer. To enable this feature, a reversing mechanism 20 is located in the sprinkler head 18 which cooperates with a deflector plate 22 located in a lower portion of the riser 16. In operation, the extent of the arcuate pattern is selected by a user, which can be up to 360°. For a full rotary sweep of 360°, the sprinkler head 18 simply continues rotating in a circle. For any sweep short of 360°, the sprinkler head 18 reaches one limit of the rotation, and then reverses direction.

Figure 2:
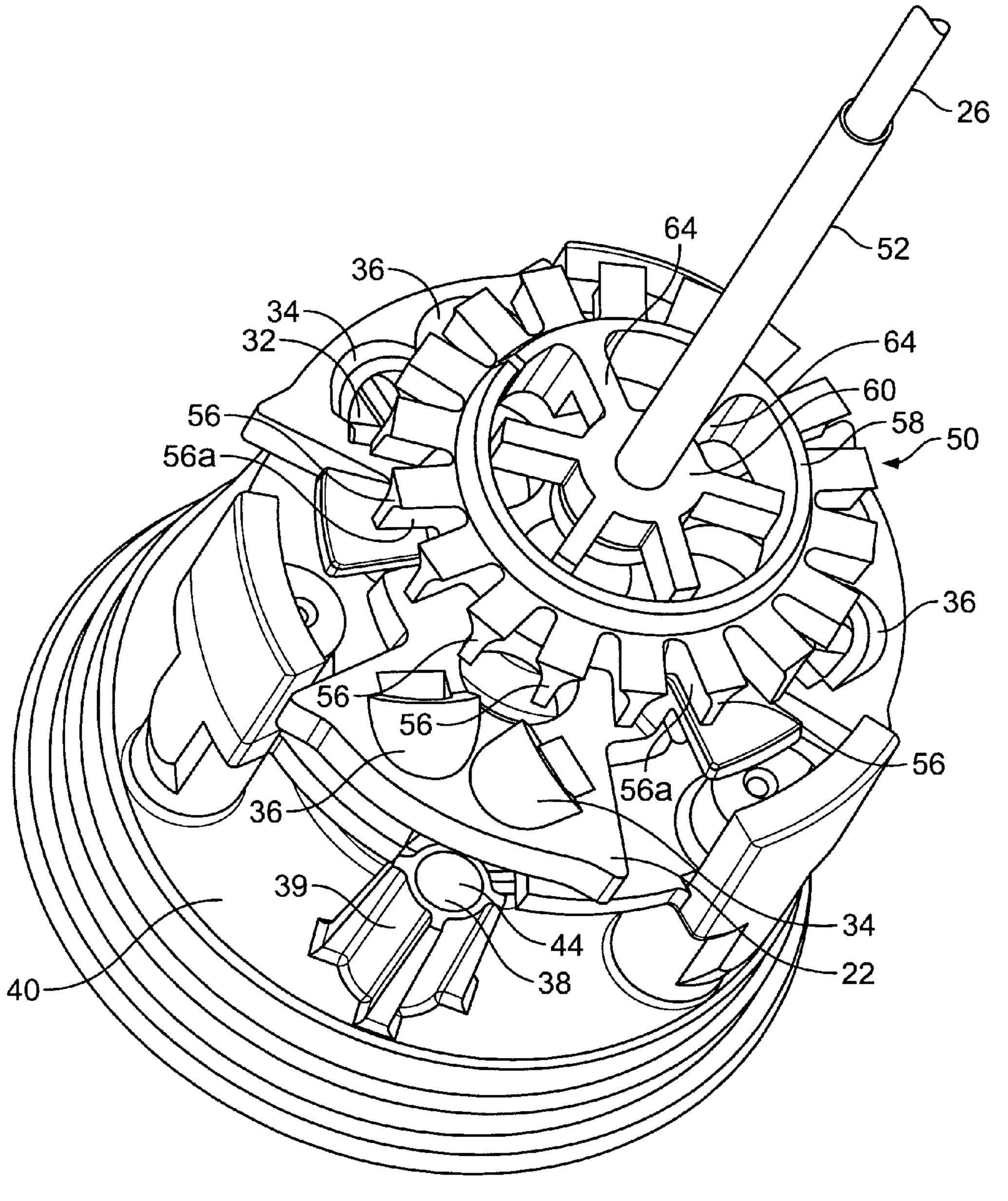
FIG. 2 is a perspective view of the turbine, the deflector plate, and the stator assembly of the rotary sprinkler of FIG. 1.

More specifically, when the sprinkler head 18 reaches one limit, a portion rotating therewith engages an upper portion 24 of a rod, referred to herein as a trip rod 26, causing the same to rotate a short amount. A lower portion 28 of the trip rod 26 is secured to the deflector plate 22 so that the short rotation made by the trip rod 26 when engaged by the sprinkler head 18 rotates the deflector plate 22 a small amount, in the order of 19°. As can be seen in FIG. 2, the deflector plate 22 has deflector openings 32 for directing water flow in a direction, either clockwise or counter-clockwise, within the riser 16. In one position, flow is received by one or a set 34 of deflector openings 32 oriented in one direction, and the small rotation of the deflector plate 22 allows fluid flow to pass through one or a set 36 of oppositely oriented deflector openings 32. Each set 34, 36 preferably includes three deflector openings 32. The deflector plate 22 is provided with one or more torsion springs (not shown) so that the deflector plate 22 is generally held in the selected position.

More specifically and with reference to FIG. 1, water flows through ports 38 defined by short tubular towers 39, which extend upward from the top of a stator plate 40. Water flowing upwardly through a lower portion 17 of the riser 16 contacts a bottom side 42 of the stator 40 and is forced into the ports 38. For one direction of flow, the deflector plate 22 is positioned with the deflector opening set 34 aligned with a top opening 44 of the port 38 and for the other direction, the deflector plate 22 is shifted so that the other deflector opening set 36 is aligned with the top opening 44 in the port 38.

The direction of water flow from the deflector plate 22, which is dictated by the alignment of the deflector opening sets 34, 36 with the port opening 44, determines the direction of rotation for the sprinkler head 18. An apparatus utilizing such a reversing feature is described in commonly-assigned U.S. Pat. No. 6,732,950, incorporated herein by reference in its entirety. The water discharged from the deflector opening sets 34, 36 drives the turbine 50 in a rotary fashion.

As illustrated in FIG. 2, the turbine 50 is secured with a hollow turbine drive shaft 52 positioned around the trip rod 26. In this manner, the turbine 50 and turbine drive shaft 52 are free to rotate relative to the trip rod 26. When water strikes the turbine 50 in a particular direction, the turbine 50 is driven in the same clockwise or counter-clockwise direction of the water. Towards this end, the turbine 50 includes generally vertically aligned vanes 56 extending from a turbine ring 58. The vanes 56 have a pair of opposed lateral sides 56*a* that are slightly arcuate from the vertical plane. The turbine 50 further includes a generally central hub 60 secured with a lower portion 62 (FIG. 1) of the turbine drive shaft 52. The turbine ring 58 and hub 60 are connected by spokes 64, an arrangement which will be described in greater detail below.

The turbine drive shaft 52 operably couples turbine 50 to a drive mechanism 70. The turbine 50 under normal operating conditions, being driven by water, rotates at a rate typically ranging between 1000-2000 revolutions per minute. Were the sprinkler head 18 to rotate at such a rate, the water emitted therefrom would tail, that is, achieve only a short throw distance and be deposited a short distance from the sprinkler head 18. Accordingly, the drive mechanism 70 provides appropriate speed reduction.

Towards this end, the drive mechanism 70 includes a series of gear modules 72, each providing a gear ratio. In this manner, the gear modules 72 reduce the high-speed rotation of the turbine 50 to a low-speed rotation for the sprinkler head 18 in the order of ⅓ revolution per minute. The turbine drive shaft 52 is secured with a drive gear 74 of the drive mechanism 70 such that the drive gear 74 co-rotates with the turbine 50 and the turbine drive shaft 52. The drive mechanism 70 further includes an output hub 76 for receiving a drive shaft 78 connected to the sprinkler head 18. Accordingly, rotation of the turbine 50 is communicated to the drive mechanism 70, which reduces the speed and increases the torque for the rotation, and the drive mechanism 70 communicates the reduced speed to the sprinkler head 18 for rotation thereof.

During winterization, high-pressured air is forced through the sprinkler 10. The air flow increases the rate of rotation of the turbine 50 several fold. At a high rotation rate, a high friction is experienced between the turbine drive shaft 52 and the trip rod 26, which extends through the drive mechanism 70, and in other components of the sprinkler 10. The turbine 50 is thus constructed to reduce the rotation rate, particularly during this winterization process. In a preferred form, the turbine 50 is made from material, such as nylon with carbon fiber filler, having a high thermal conductivity to enable the turbine 50 to dissipate heat for the friction.

Figure 3:
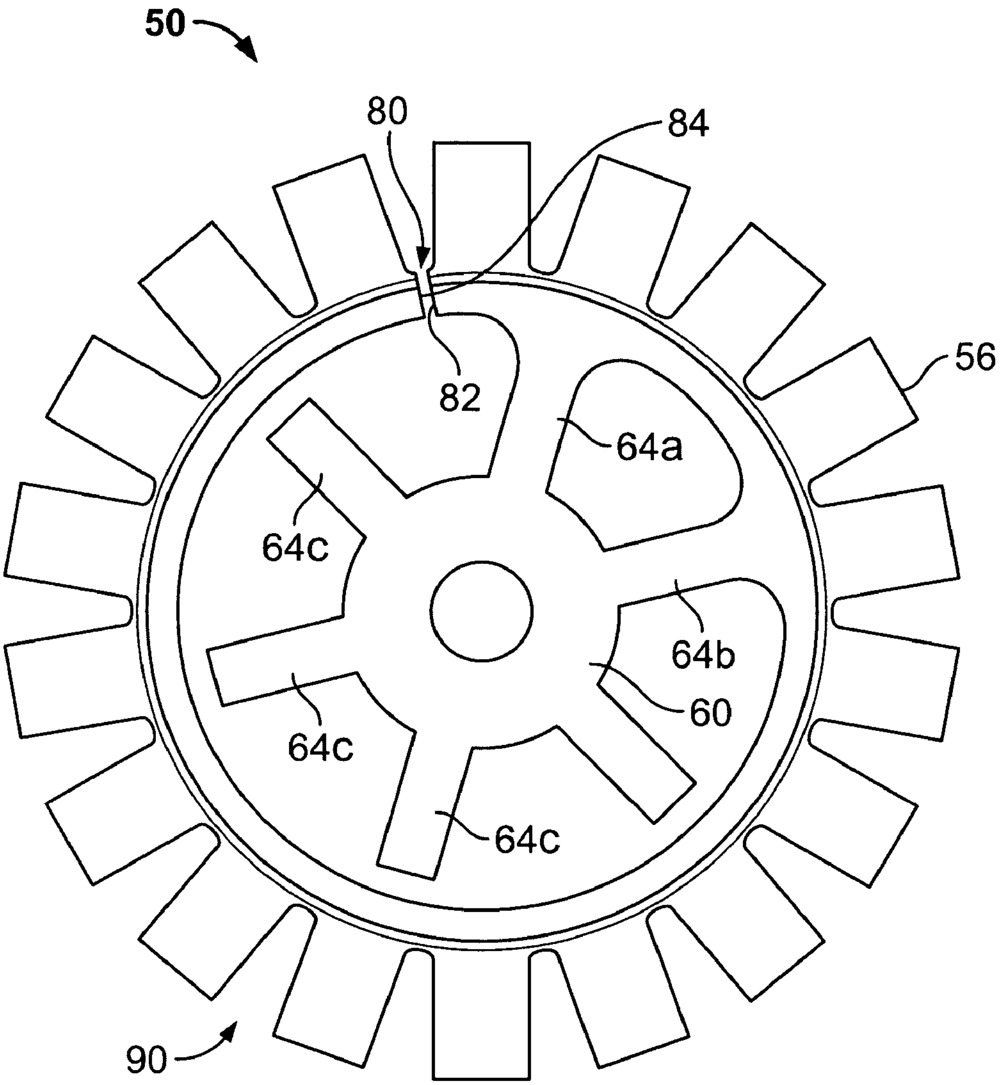
FIG. 3 is a top plan view of the turbine of FIG. 2 in a normal operating condition.
Figure 4:
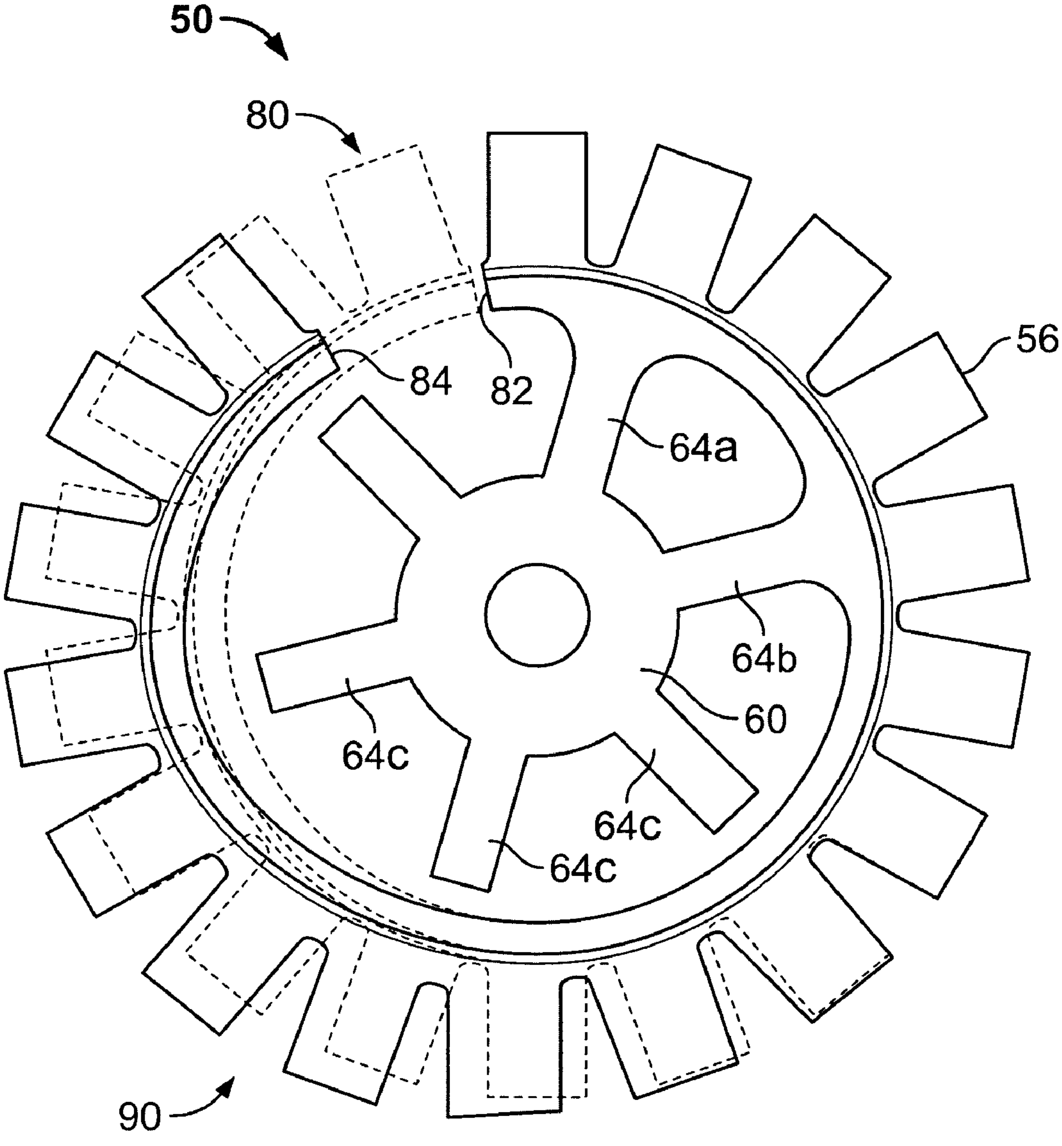
FIG. 4 is a top plan view of the turbine of FIG. 2 shifted from the normal operation condition to a deflected condition.

As noted above, the turbine 50 includes the hub 60 connected to the turbine ring 58 by spokes 64 and vanes 56 extending from the ring 58. With reference to FIGS. 3 and 4, the spokes 64 can be seen as a pair of spokes 64*a*, 64*b* positioned relatively close to one another in one quadrant of the ring 58. The ring 58 is in the form of a split ring. More specifically, it is generally 360° with a split 80. The split 80 is defined by a first end 82 positioned generally adjacent to the spoke 64*a* and a second end 84 facing the first end 82 arcuately across the split 80. Viewed another way, the ring 58 forms an arcuate arm 90 extending from the second end 84 to the spoke 64*b*. The arm 90 preferably spans a majority of the ring 58, such as spanning through 270° or more of the arcuate extent of the ring 58.

During non-operation, the first and second ends 82 and 84 may contact each other or may be separated by a relatively small distance at the split 80, in the order of 0.030 inches, as depicted in FIG. 3. During normal water operating conditions, the first and second ends 82, 84 separate or widen a relatively small amount. For example, they may separate on the order of 0.010 inches, in addition to the small distance noted above, for a ring 58 having an inner diameter of approximately 0.750 inches, while the radial extent of the vanes 56 forms a circle having an outer diameter of approximately 1.000 inches.

As the rotational velocity of the turbine 50 increases, such as due to high-pressure air through the sprinkler 10, the split 80 increasingly widens. More specifically, the ring arm 90 deflects outwardly due to centripetal force. Normal operation conditions are typically sufficient to deflect the arm 90 only a slight amount, such as that noted above as an example. However, under high rotational velocity due to air flow, the arm 90 deflects such that the split 80 widens to a relatively significant amount. For example, it may widen to approximately 0.150 inches. It should be noted that design parameters of the turbine 50 may be altered such that the split 80 may similarly widen for excessive flow rates of water. It should also be noted that these design parameters may include varying the mass and the stiffness of the arm 90 so that the deflection is activated at a desired speed.

The turbine 50 having the arm 90 deflected outward experiences less of a drive force from the fluid flow through the sprinkler 10. Particularly, it is noted that the deflector openings 32 direct fluid streams directly into the vanes 56 at the proper angle for driving the turbine 50. When the arm 90 deflects outward, a significant number of the vanes 56 shift at least partially out of alignment with the deflector openings 32. Therefore, a portion of the air through the deflector openings 32 passes by the turbine 50 without contacting the vanes 56 or contacting the vanes 56 in an inefficient manner. Thus, the contribution of any energy to the rotation of the turbine 50 is significantly reduced.

It should be noted that the turbine 50 includes dead spokes 64*c*. These spokes 64*c* assist in balancing the turbine 50 which, as noted herein, may rotate at high speeds. Furthermore, the dead spokes 64*c* increase the amount of heat, such as that generated by friction between the turbine drive shaft 52 and the trip rod 26, that may be dissipated from the turbine 50. The flow of fluid across and through the turbine 50 also assists in dissipating heat. The dead spokes 64*c* are separated from the ring 58 by a short distance 67, such as in the order of 0.050 inches.

The design of the turbine 50 reduces the rotation rate during winterization to an acceptable rate. To compare, a turbine (not shown) of the prior art is similarly constructed to the turbine 50, though without the split 80 and with the ring 58 not forming the arm 90. Accordingly, a prior art turbine has a generally static shape and does not deflect outwardly under high rotation. During winterization, an expected rotation rate for the prior art turbine under common and particular air pressure conditions may be as high as approximately 48,000 revolutions per minute. In contrast, the present turbine 50 under generally identical air pressure conditions has a rate of rotation of approximately 16,000 revolutions per minute. In this manner, the friction between the turbine drive shaft 52 and trip rod 26 is drastically reduced, and the above-described issues with high-speed rotation are alleviated or reduced.

The amount of friction at this reduced speed is within an acceptable amount for relative long-term life of the sprinkler 10. During winterization testing, the sprinkler 10 including the split-ring turbine 50 did not show significant amounts of wear after 75 minutes of high-pressure air flow.

It should be noted that the flow of high-pressure air through the sprinkler 10 provides a retarding force or drag on the outwardly deflected turbine arm 90. As stated above, water flowing upwardly through riser lower portion 17 contacts the stator bottom side 42 and feeds through the ports 38. In the event pressure below the bottom side 42 exceeds a predetermined level, a bypass valve 100 opens.

As can be seen in FIG. 1, the bypass valve 100 includes a moving member 102 biased downward by a spring 104. In this manner, the moving member 102 is received against a valve seat, presently represented in the form of a shoulder 106 surrounding a bypass opening 108 formed in the stator 40. When a pressure differential between the top and bottom of the stator 40 exceeds the predetermined level, the bias of the spring 104 is overcome, and the moving member 102 is forced upward and away from the shoulder 106. As such, the bypass opening 108 is opened such that fluid may pass through the stator 40 without passing through the ports 38, as described above.

When the bypass valve 100 is at least partially opened, a bypass portion of the air flows around the moving member 102 and flows upward and radially outward. As can be seen, the bypass portion of the air thus flows around or radially outboard of the deflector plate 22, without passing through the deflector openings 32. This bypass air flow is disruptive to the air flow directed through the ports 38 to the deflector openings 32. More importantly, once passing through the sprinkler 10 to the turbine 50, this bypass portion of the air flow, generally vertically flowing, retards the rotational motion of the turbine 50. In this manner, the reduced rotation rate of the turbine 50 is, in part, influenced by the bypass valve 100.

While the invention has been described with respect to specific examples including presently preferred modes of carrying out the invention, those skilled in the art will appreciate that there are numerous variations and permutations of the above described apparatuses and methods that fall within the spirit and scope of the invention as set forth in the appended claims.

What is claimed is:

1. A turbine for rotating a drive axle of a rotary sprinkler comprising:

a central portion secured to the drive axle such that the turbine and the drive axle rotate together to power the rotary sprinkler;

a deflectable portion attached to the central portion and having a first position in which the turbine is rotating in an acceptable range of revolutions per minute and a second position shifted from the first position to prevent the turbine from rotating in an unacceptable range of revolutions per minute; and a split ring extending about the central portion and having at least a portion of the deflectable portion;

wherein at least one spoke interconnects the central portion and the ring.

2. The turbine of claim 1 wherein at least two spokes interconnect the central portion and the split ring.

3. A turbine for rotating a drive axle of a rotary sprinkler comprising:

a central portion secured to the drive axle such that the turbine and the drive axle rotate together to power the rotary sprinkler;

a deflectable portion attached to the central portion and having a first position in which the turbine is rotating in an acceptable range of revolutions per minute and a second position shifted from the first position to prevent the turbine from rotating in an unacceptable range of revolutions per minute; and a split ring extending about the central portion and having at least a portion of the deflectable portion;

wherein the deflectable portion includes at least 180 degrees of the circumferential extent of the split ring and the at least one spoke being located outside the at least 180 degrees.

4. The turbine of claim 3 wherein the deflectable portion includes at least 270 degrees of the circumferential extent of the split ring and the at least one spoke being located outside the at least 270 degrees.

5. The turbine of claim 3 wherein the split ring has a first free end at the deflectable portion and a second end opposing the first free end.

6. The turbine of claim 5 wherein the first free end and the second end are spaced apart by a distance of less than generally 0.030 inches for the first position.

7. The turbine of claim 6 wherein the first free end and the second end are spaced apart by a distance of greater than generally 0.150 inches for the second position.

8. The turbine of claim 5 wherein the split ring further comprises a plurality of vanes for being engaged by flow through the rotary sprinkler to rotate the turbine to power the rotary sprinkler.

9. A turbine for rotating a drive axle of a rotary sprinkler comprising:

a central portion secured to the drive axle such that the turbine and the drive axle rotate together to power the rotary sprinkler; and a deflectable portion attached to the central portion and having a first position in which the turbine is rotating in an acceptable range of revolutions per minute and a second position shifted from the first position to prevent the turbine from rotating in an unacceptable range of revolutions per minute;

wherein the deflectable portion in the first position is generally aligned with a driving fluid flow during which water is distributed from the sprinkler, and the deflectable portion in the second position is shifted to decrease the alignment when air is flowing through the sprinkler.

* * * * *